April 16, 1935.   F. B. WILLIAMSON, JR   1,997,618
PROCESS FOR MAKING HOSE
Original Filed June 13, 1931   2 Sheets-Sheet 1

Inventor
Frederick Beasley Williamson Jr.
By Beale and Park
Attorney

April 16, 1935.  F. B. WILLIAMSON, JR  1,997,618
PROCESS FOR MAKING HOSE
Original Filed June 13, 1931  2 Sheets-Sheet 2

Inventor
Frederick Beasley Williamson
By Beale and Park
Attorney

Patented Apr. 16, 1935

1,997,618

UNITED STATES PATENT OFFICE 1,997,618

PROCESS FOR MAKING HOSE

Frederick Beasley Williamson, Jr., Elizabeth, N. J., assignor to The Whitehead Bros. Rubber Co., Trenton, N. J., a corporation of New Jersey Original application June 13, 1931, Serial No. 544,257. Divided and this application October 18, 1932, Serial No. 638,425

2 Claims. (Cl. 154—8)

My invention consists in a new and useful improvement in the process of producing hose, and this application is a divisional application from my application Serial Number 544,257, filed in the United States Patent Office on June 13, 1931. My improved process is designed to provide a hose which may be used for both pressure and suction purposes, which is to say that the hose produced by my improved process may be used as a conduit for fluids under pressure in which uses it is adapted to withstand heavy pressure from within exerted outwardly, and it may be used also as a suction hose in which uses it is adapted to withstand pressure from without exerted inwardly.

The important novel feature of my improved process is the provision of a resistant wall coated by an impervious lining upon its inner side and an impervious cover upon its outer side, in such a manner that the material of the inner lining and the outer cover passing through the resistant wall coalesce to form an homogeneous mass.

The pressure resistant element of my hose is a woven fabric wall in which the strength element is secured by the spiral arrangement of a resilient wire of sufficient resistance quality as to resist such pressures as may be exerted on either side of this wall, in any uses for which my hose is designed to be used. To this resistant wall, by my improved process I apply a lining of rubber or other suitable impervious material. I am aware that it is known practice to make pressure hose with a resistance wall and a lining of rubber. However, such pressure hose cannot be used as a suction hose, since the atmospheric pressure exerted through the fabric wall by reason of the penetration of air through the fabric wall will cause the collapse of the inner rubber lining. In other words, in the ordinary form of pressure hose, the pressure wall affords protection against pressure in only one direction, viz. outward pressure. However, by my improved process an outer impervious covering is provided for the resistant wall.

I am aware that it is known practice to make suction hose with a resistance wall having a cover of rubber or suitable material. However, such suction hose cannot be used as a pressure hose, since the outer rubber cover, though preventing air from passing through the resistant wall when the hose is used for suction, will expand away from the resistant wall, if the hose is used as a pressure hose, since the fluid under pressure passes through the resistant wall and expands the outer rubber cover. When this happens, the resistant wall, being separated from its rubber cover, is liable to displacement injuring the hose.

But by providing, by my improved process, the inner rubber lining I prevent the passage of the fluid under pressure through the resistant wall, and thus avoid any expansion of the outer rubber wall.

My improved process by which I relate the resistant wall and the inner and outer rubber walls consists in the following steps. I fabricate my resistant wall, composed of the helical resilient wire and cotton woof threads and the cotton warp threads, in such a manner that interstices are afforded therein. Then when the rubber inner wall is applied to the resistant wall the particles of rubber penetrate these interstices. Then when the rubber outer wall is applied, the particles of the inner rubber wall and the particles of the outer rubber wall coalesce. The result is to form a substantially homogeneous product in which the fabric of the resistant wall is incorporated in the rubber.

While I have illustrated diagrammatically in the drawings filed herewith the various steps of my improved process, it is to be distinctly understood that I do not consider my invention limited thereby but refer for its scope to the claims appended hereto.

Figure 1:
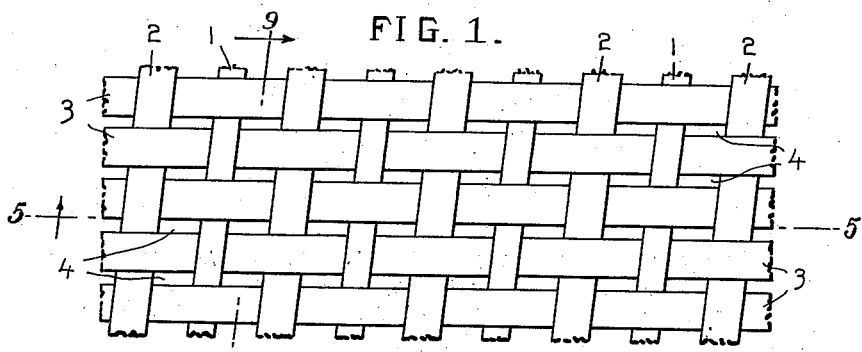
Fig. 1 is a front elevation of a fragment of the woven resistant wall, as it appears while in the loom, the resilient woof thread being expanded and the weave being open.
Figure 2:
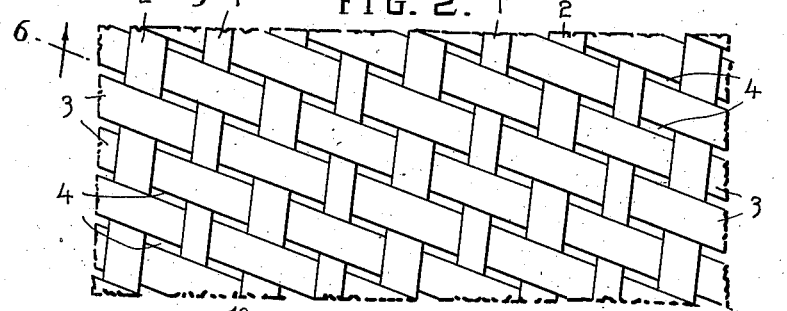
Fig. 2 is a similar view of the fragment as it appears after removal from the loom, the resilient woof thread being released and twisting the warp threads to close the weave.

As illustrated in the drawings the resistant wall is composed of the spiral woof thread 1 of cotton and the spiral woof thread 2 of resilient wire so designed as to tend to twist the wall when unrestrained, and the cotton warp threads 3. As clearly indicated in Fig. 1, the method of weaving this resistant wall is such as to provide an open weave producing interstices 4. It is obvious from a comparison of Figs. 1 and 2 that the resiliency of the wire woof thread 2 causes the wall to twist when the wire 2 is released on removal from the loom, causing the warp threads 3 to spiral, as shown in Fig. 2, thus tending to close the weave.

Figure 3:
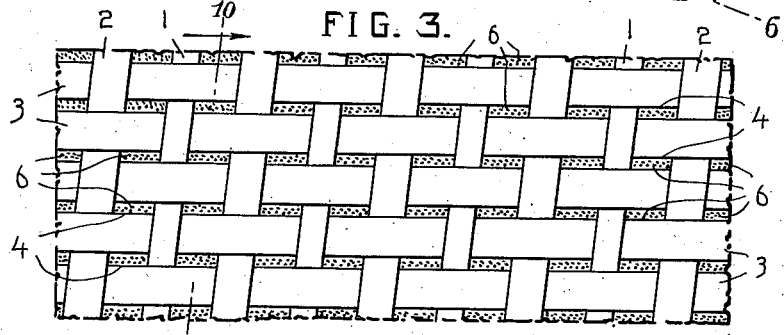
Fig. 3 is a similar view of the fragment as it appears when the resistant wall being restored to the position indicated in Fig. 1 by twisting has had the inner lining of rubber applied thereto.
Figure 4:
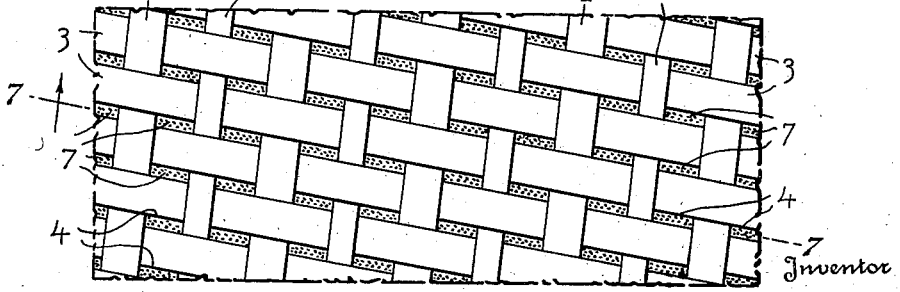
Fig. 4 is a similar view of the fragment as it appears when the resistant wall has been released, the resilient woof thread tending to compress the weave and extrude the particles of the rubber lining.
Figure 9:
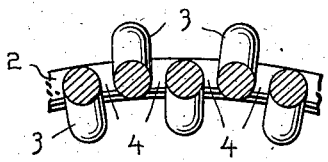
Fig. 9 is a section on the line 9—9 of Fig. 1.
Figure 10:
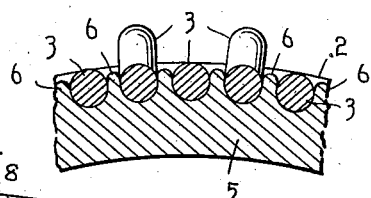
Fig. 10 is a section on the line 10—10 of Fig. 3.
Figure 11:
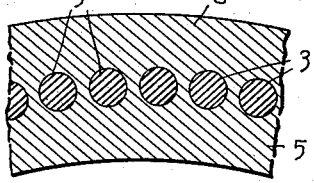
Fig. 11 is a transverse section of the fragment of the completed hose.
Figure 5:
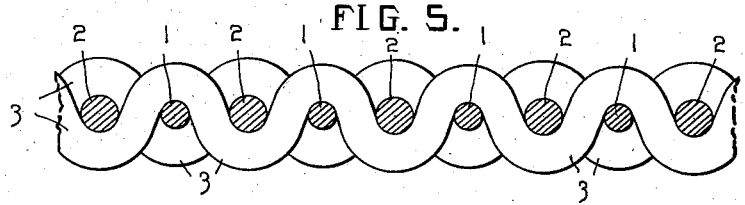
Fig 5 is a section on line 5—5 of Fig. 1.
Figure 6:
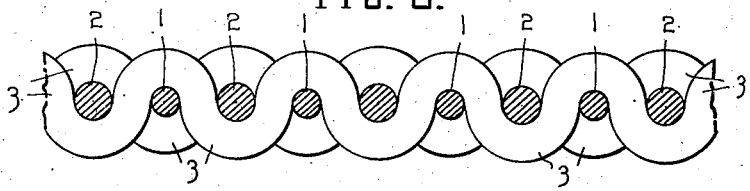
Fig. 6 is a section on the line 6—6 of Fig. 2.
Figure 7:
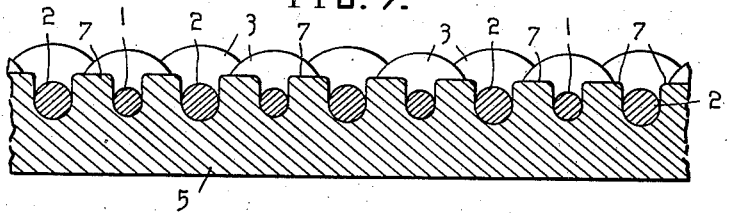
Fig. 7 is a section on the line 7—7 of Fig. 4.
Figure 8:
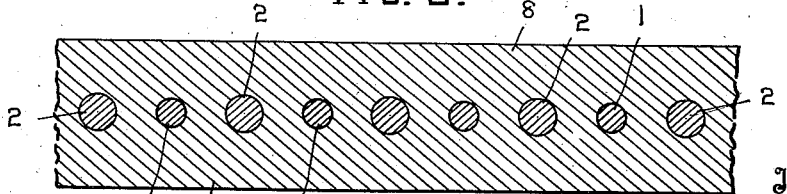
Fig. 8 is a lateral section of the fragment of the completed hose.

When the inner rubber lining 5 is to be applied to the resistant wall, the wall is untwisted and held in such form, to cause the weave to open, in order that the lining 5 may pass through and fill the interstices 4 with fillers 6, as shown in Figs. 3 and 10.

I have found by experience that I can apply the inner rubber lining 5 directly to the resistant wall while it is still in the loom, the weave being open. I do this by applying the inner wall of rubber to a removable mandrel, while the rubber is in a condition of plasticity and then running this rubber lining 5, on the mandrel, through the loom, thus applying the lining 5 to the resistant wall while its weave is still open, between the shuttle and the take-off.

After the interstices 4 have become packed with the fillers 6, the resistant wall being released, the wire 2 twisting the wall and causing the weave to partially close, will extrude portions of the fillers 6 to form heads 7 of rubber on the outer face of the resistant wall.

The outer covering wall of rubber 8 is then applied which coalesces with the portions 6 and 7 of the inner rubber lining 5.

Thus it is obvious that by my improved process I can produce a hose having a resistant wall incorporated in the rubber which forms an impervious inner lining and an impervious outer cover. The character of this product thus produced by my improved process is such that it may be used both as a pressure hose and as a suction hose.

Having described my invention, what I claim is:

1. The process of making a pressure and suction hose which consists in twisting a helical resilient coil of wire constituting the woof of a woven tubular fabric thereby opening the meshes of the fabric, applying a lining of rubber material under pressure to the fabric and through the meshes while said coil is deformed and twisted, extruding said rubber material through the meshes by untwisting said coil, and applying an outer covering to the wall and to the extruded portions of the lining.

2. In the manufacture of hose having a tubular fabric wall covered inside and outside with rubber, the improvement which consists in incorporating a helical resilient coil of wire in the fabric wall, opening the meshes of the fabric by twisting said coil and applying rubber material through the opened meshes under pressure, and extruding said rubber material through the meshes by the pressure of said coil due to its tendency to return to normal condition.

FREDERICK B. WILLIAMSON, Jr.